(12) United States Patent
Plattner (10) Patent No.: US 8,839,641 B1
(45) Date of Patent: Sep. 23, 2014

(54) FLOW CONTROL SYSTEM FOR AN AIRCRAFT

(76) Inventor: Wesley M. Plattner, Tipton, MI (US)

( * ) Notice: Subject to any disclaimer, the term of this patent is extended or adjusted under 35 U.S.C. 154(b) by 298 days.

(21) Appl. No.: 13/495,615

(22) Filed: Jun. 13, 2012

Related U.S. Application Data (62) Division of application No. 12/431,049, filed on Apr. 28, 2009, now Pat. No. 8,206,088.

(51) Int. Cl.
*F25D 9/00* (2006.01)

(52) U.S. Cl.
USPC ............................................. 62/401; 62/402

(58) Field of Classification Search
CPC .......... F25B 9/004; B64D 13/06; Y02T 50/56
USPC .................. 62/86, 401, 402, 244; 454/71, 76; 165/42, 235
See application file for complete search history.

(56) References Cited

U.S. PATENT DOCUMENTS

| | | | |
|---|---|---|---|
| 5,918,472 A * | 7/1999 | Jonqueres | 62/87 |
| 6,148,622 A * | 11/2000 | Sanger | 62/88 |
| 6,401,473 B1 | 6/2002 | Ng et al. | |
| 6,427,471 B1 * | 8/2002 | Ando et al. | 62/402 |
| 6,449,963 B1 | 9/2002 | Ng et al. | |
| 6,672,541 B2 | 1/2004 | Fieldson et al. | |
| 6,817,576 B2 | 11/2004 | Brady et al. | |
| 6,845,630 B2 * | 1/2005 | Bruno et al. | 62/323.3 |
| 7,040,112 B2 * | 5/2006 | Axe et al. | 62/401 |
| 8,435,103 B2 * | 5/2013 | Centofante | 454/71 |
| 2004/0194493 A1 * | 10/2004 | Army et al. | 62/402 |
| 2007/0266695 A1 | 11/2007 | Lui et al. | |

* cited by examiner

*Primary Examiner* — Mohammad M Ali
(74) *Attorney, Agent, or Firm* — Young Basile Hanlon & MacFarlane P.C.

(57) ABSTRACT

A method for providing a flow control system for an aircraft. A compressor is removed from an existing air cycle machine, along with compressor ducting that is connected to a primary stage outlet of the heat exchanger and a secondary stage inlet of the heat exchanger in the existing air cycle machine. A first connector duct is provided and connected to the primary stage outlet of the heat exchanger and the secondary stage inlet of the heat exchanger. The turbine is removed from the existing air cycle machine, and a second connector duct is provided and connected to the upstream turbine duct directly and the downstream turbine duct.

11 Claims, 6 Drawing Sheets

FLOW CONTROL SYSTEM FOR AN AIRCRAFT

CROSS-REFERENCE TO RELATED APPLICATIONS

This application is a divisional of U.S. patent application Ser. No. 12/431,049, filed on Apr. 28, 2009, which is incorporated herein by reference in its entirety.

FIELD OF THE INVENTION

The present invention relates to the field of environmental control systems for aircraft and, more particularly, to a flow control system and a method for converting an existing air cycle system into a flow control system.

BACKGROUND OF THE INVENTION

Commercial aircraft typically include environmental control systems that regulate air supply, temperature, and cabin pressurization on the aircraft. Such environmental control systems may also be utilized to provide cooling to components of the aircraft itself, such as electrical systems. The environmental control system of most jet aircraft typically includes two or more air cycle machine cooling devices, which provide pressurized air of an appropriate temperature to the cabin of the aircraft by utilizing heated, pressurized bleed air from the jet engines or auxiliary power unit of the aircraft, as well as ram air, which is ambient air that enters the aircraft through a ram scoop.

A typical air cycle machine includes a turbine that is mechanically connected to a compressor, such that the turbine provides a rotational force to the compressor in order to operate the compressor. The turbine and compressor are selectively operable and cooperate to reduce the temperature of the bleed air to allow cooling of the aircraft. However, a typical air cycle machine also includes a heat exchanger that cools the bleed air using the ram air. When the aircraft is in flight, the ambient air temperature is so low that operation of the turbine and compressor is not needed to cool the bleed air, and thus, the turbine and compressor air typically only operate when the aircraft is flying at low altitude or on the ground.

While the air cycle machines are well-suited to conditioning and pressurizing air both while the airplane is on the ground and while the airplane is in flight, the air cycle machines are heavy, and the added weight that must be carried by the aircraft causes an increase in fuel consumption. Furthermore, in applications where passengers are not being transported by the aircraft, the presence of redundant air cycle machines on the aircraft is unnecessary, and simultaneous operation of these redundant systems further increases fuel consumption. Accordingly, it would be desirable to have an environmental control system for an aircraft that was of reduced weight and complexity.

SUMMARY OF THE INVENTION

The invention provides a method for providing a flow control system for an aircraft by converting an existing air cycle machine on the aircraft. The existing air cycle machine includes a heat exchanger with a primary stage and a secondary stage, a compressor that is connected to the heat exchanger by a compressor ducting section, a turbine that is connected to the heat exchanger by an upstream turbine duct, and a downstream turbine duct that is connected to the turbine.

The method comprises the steps of removing the compressor, removing the compressor ducting from a primary stage outlet of the heat exchanger and a secondary stage inlet of the heat exchanger, providing a first connector duct, connecting the primary stage outlet of the heat exchanger to the first connector duct, and connecting the secondary stage inlet of the heat exchanger to the connector duct such that air may travel from the primary stage of the heat exchanger directly to the secondary stage inlet of the heat exchanger by way of the first connector duct. The method also comprises the steps of removing the turbine, providing a second connector duct, and connecting the upstream turbine duct directly to the downstream turbine duct using the second connector duct.

The method may further include the steps of providing the air cycle machine having a bypass valve disposed in the upstream turbine duct, wherein the bypass valve is electrically connected to a control system to provide operating signals thereto, providing the air cycle machine having a bypass duct connected to the upstream turbine duct and the downstream turbine duct, wherein the bypass valve selectively directs air to the turbine or through the bypass duct, removing the bypass valve from the upstream turbine duct, and providing a third connector duct, replacing the bypass valve with the third connector duct. The method may further include the steps of disconnecting the electrical connection between the bypass valve and the control system, providing a valve feedback unit operable to provide operating signals to the control system, and electrically connecting the valve feedback unit to the control system.

Additionally, the valve feedback may be configured to provide operating signals that emulate the operating signals provided by the bypass valve to the control system prior to the step of disconnecting the electrical connection between the bypass valve and the control system.

The method may further include the steps of providing the air cycle machine having a water separator connected to a primary stage outlet of the heat exchanger and to a system outlet duct and replacing the water separator with a fourth connector duct. The method may also include the steps of providing the air cycle machine having the system outlet connected to a mixing manifold and providing the air cycle machine having at least one auxiliary air cycle machine connected to the mixing manifold.

The invention also provides an environmental control system for an aircraft that includes a bleed air source that is connected to at least a first air cycle machine and at least a first flow control system. The air cycle machine that has an air cycle inlet that is connected to the bleed air source and is operable to provide conditioned air to an air cycle outlet. The flow control system has a flow control inlet that is connected to the bleed air source and is operable to provide cooled air to a flow control outlet. The cooled air is produced by the flow control system and may be produced solely by heat exchange. A mixing manifold receives conditioned air from the air cycle machine and cooled air from the flow control system and is operable to selectively provide the cooled air, the conditioned air, or mixed air to the aircraft. The mixing manifold produces the mixed air by mixing the cooled air and the conditioned air. The air cycle machine may include at least one turbine-compressor pair to produce conditioned air.

BRIEF DESCRIPTION OF THE DRAWINGS

The description herein makes reference to the accompanying drawings, wherein like referenced numerals refer to like parts throughout several views and wherein.

DESCRIPTION OF THE PREFERRED EMBODIMENT

Referring to the drawings, the present invention will now be described in detail with reference to the disclosed embodiment.

Figure 1:
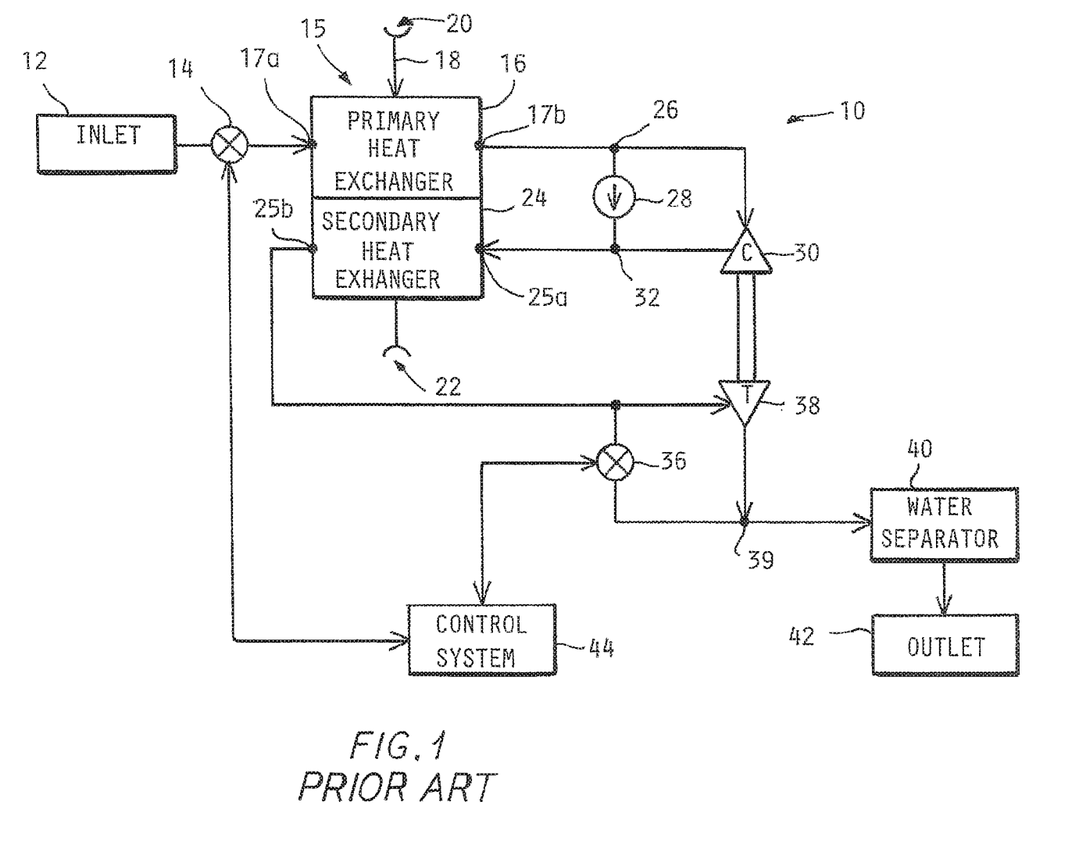
FIG. 1 is a block diagram showing a conventional air cycle machine of an aircraft.

FIG. 1 shows a conventional air cycle machine 10, which is used to provide a fresh air supply, temperature control, and cabin pressurization in an aircraft (not shown). The air cycle machine 10 includes a bleed air inlet 12, which is typically connected to a source of heated, pressurized air, such as a bleed air port (not shown) that is provided in a compressor stage of one of the engines (not shown) of the aircraft. A flow control valve 14 is disposed downstream of the inlet 12 to control the quantity of bleed air introduced into the air cycle machine 10.

In order to cool the bleed air, the air cycle machine 10 includes a heat exchanger 15. The heat exchanger 15 has a primary stage 16 and a secondary stage 24. Cooling of the bleed air in the heat exchanger 15 is provided by a ram air stream 18. The ram air stream 18 enters the aircraft through a ram air scoop 20 and travels through the primary stage 16 of the heat exchanger 15 as well as the secondary stage 24 of the heat exchanger 15 before exiting the aircraft through a ram air outlet 22.

The bleed air enters the primary stage 16 of a heat exchanger 15 at a primary stage inlet 17a downstream of the flow control valve 14. The bleed air is then cooled by the ram air stream 18 in the primary stage before exiting the heat exchanger 15 at a primary stage outlet 17b. Downstream of the primary stage 16 of the heat exchanger 15, the bleed air reaches a first junction 26, where the bleed air may either proceed through a one-way check valve 28 or through a compressor 30.

If the compressor 30 is operating, air is directed from the first junction 26 through the compressor 30 due to the low pressure condition present at the inlet of the compressor 30 when it is operating, and air is prevented from returning to the first junction 26 from the high-pressure outlet of the compressor 30 by the one-way check valve 28. In the compressor 30, the bleed air is compressed, thereby pressurizing and heating the bleed air. If the compressor 30 is not operating, the majority of the bleed air proceeds through the one-way check valve 28 rather than past the non-operating compressor 30, as the bleed air traveling through the one-way check valve 28 offers less resistance. However, a portion of the bleed air travels through the non-operating compressor 30, reducing the overall efficiency of the air cycle machine 10.

Downstream of both the one-way check valve 28 and the compressor 30 is a second junction 32, where the bleed air streams from the one-way check valve 28 and the compressor 30 to rejoin one another before entering the secondary stage 24 of the heat exchanger 15 at a secondary stage inlet 25a. In the secondary stage 24 of the heat exchanger 15, the bleed air is again cooled by the ram air stream 18 before exiting the heat exchanger 15 at a secondary stage outlet 25b.

Downstream of the secondary stage 24 of the heat exchanger 15, the bleed air reaches a third junction 34, where the air may proceed either to a bypass valve 36 or to a turbine 38 that is mechanically connected to the compressor 30. If the bypass valve 36 is open, the majority of the air proceeds through the bypass valve 36, as doing so offers less resistance than traveling through the turbine 38. However, some of the bleed air may still travel through the turbine 38 while the bypass valve 36 is open, but this amount of bleed air will not cause operation of the turbine 38. The bleed air then proceeds to a water separator 40 and then to an outlet 42. If the bypass valve 36 is closed, air proceeds through the turbine 38, causing rotation of the turbine, which expands and cools the bleed air. The bleed air then proceeds from the turbine 38 to the water separator 40 and the outlet 42.

In order to regulate operation of the air cycle machine 10, a control system 44 is electrically connected to the flow control valve 14 to vary the amount of bleed air received from the inlet 12. The control system 44 is also electrically connected to the bypass valve 36 to selectively operate or bypass the turbine 38.

Figure 2:
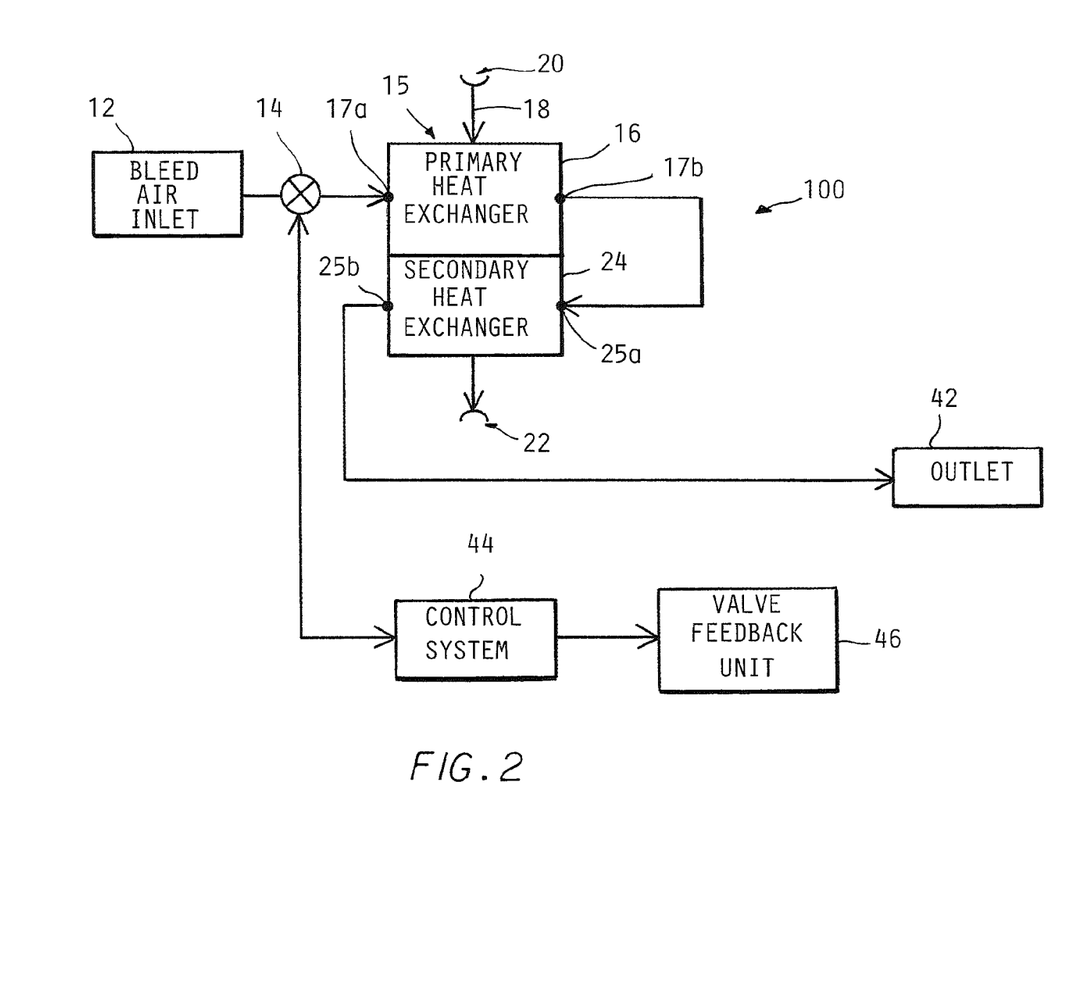
FIG. 2 is a block diagram showing a flow control system of an aircraft according to the present invention.

FIG. 2 shows a flow control system 100 according to the present invention. As described in connection with the air cycle machine 10, heated, pressurized bleed air is received at the inlet 12, and the flow control valve 14 is configured to vary the amount of bleed air provided to the primary stage 16 of the heat exchanger 15. The bleed air then enters the primary stage 16 of the heat exchanger 15 at the primary stage inlet 17a, where the bleed air is cooled by the ram air stream 18 before exiting the heat exchanger 15 at the primary stage outlet 17b.

After leaving the primary stage 16 of the heat exchanger 15, the bleed air continues directly to the secondary stage 24 of the heat exchanger 15 by way of the secondary stage inlet 25a. The connection between the primary stage 16 of the heat exchanger 15 and the secondary stage 24 of the heat exchanger 15 is direct, without junctions or valves, thereby preventing inefficiencies in the flow control system.

In the secondary stage 24 of the heat exchanger 15, the bleed air is again cooled by the ram air stream 18 before exiting the heat exchanger at the secondary stage outlet 25b. After leaving the secondary stage 24 of the heat exchanger 15, the bleed air proceeds to the outlet 42, which is directly connected to the secondary stage 24 of the heat exchanger 15 without intervening valves or junctions.

In order to regulate operation of the flow control system 100, the control system 44 is electrically connected to the flow control valve 14, as well as a valve feedback unit 46. The control system 44 regulates operation of the flow control valve 14 to control the amount of bleed air introduced into the aircraft by way of the inlet 12. Because the control system 44 is configured such that it expects to receive signals from a bypass valve such as the bypass valve 36 of the air cycle machine 10, the flow control system 100 includes a valve feedback unit 46. The valve feedback unit 46 does not include nor is associated with an actual valve that controls an aspect of flow of air through the flow control system 100. Rather, the valve feedback unit 46 is an electrical apparatus configured to emulate the electrical signals that would be output by the bypass valve 36 of the air cycle machine 10 without causing corresponding changes in the operation of the flow control system 100.

Figure 3:
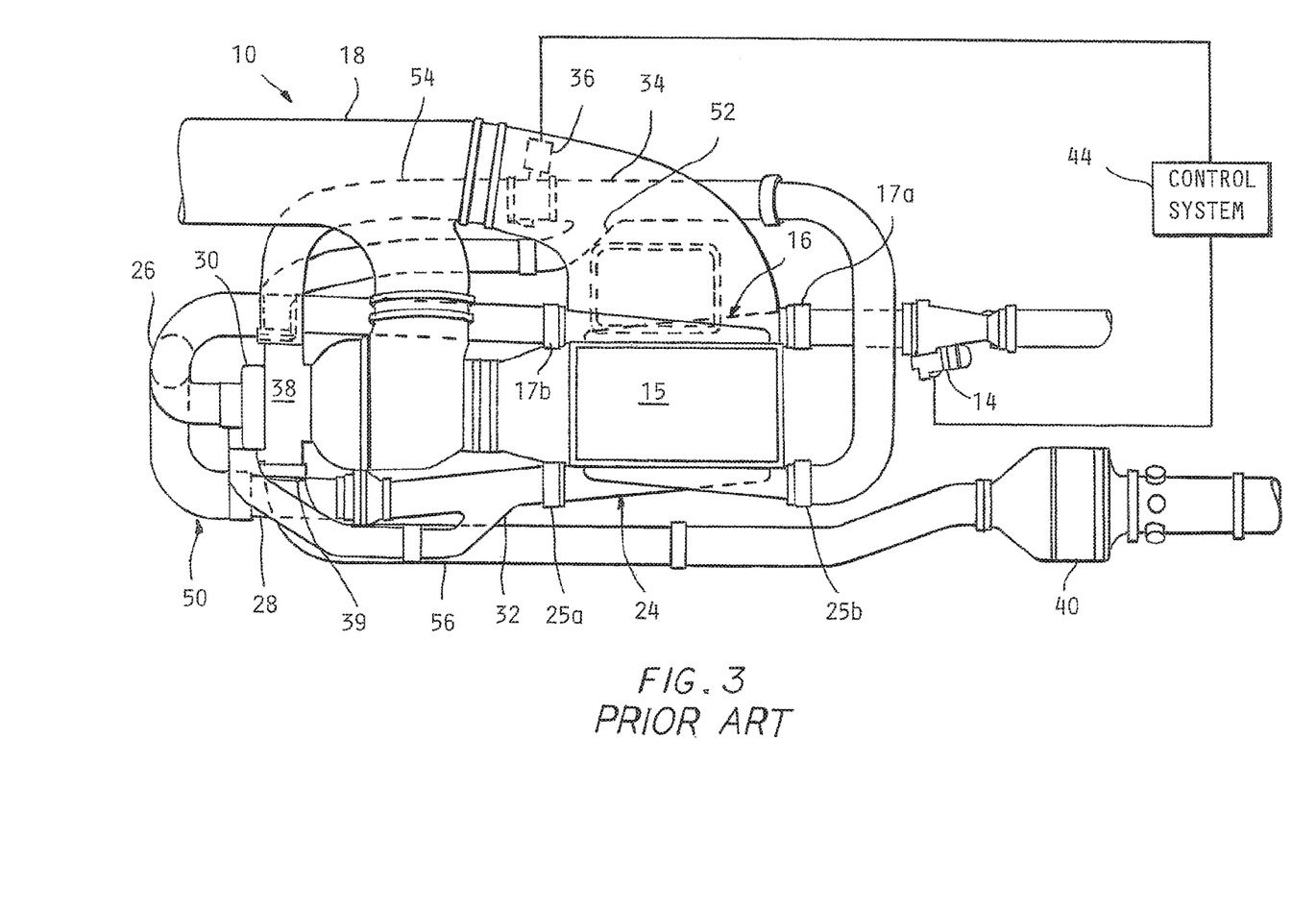
FIG. 3 is an illustration of an existing air cycle machine of an aircraft prior to modification according to the method of the present invention.

In a method according to the present invention, the air cycle machine 10 can be modified to provide the flow control system 100. As shown in FIG. 3, the air cycle machine 10 includes a compressor ducting section 50 that is connected to the primary stage outlet 17b and the secondary stage inlet 25a of the heat exchanger 15. The compressor ducting section 50 transports air from the primary stage 16 of the heat exchanger 15 to the secondary stage 24 of the heat exchanger 15 by way of the one-way check valve 28 of the compressor 30 if the compressor 30 is in operation. Thus, the compressor ducting section 50 includes the first junction 26, the one-way check valve 28, the compressor 30, the second junction 32, and the necessary piping to interconnect these elements with the heat exchanger 15. The air cycle machine 10 further includes an upstream bypass duct 52 that extends from the third junction 34 to the turbine 38, an upstream turbine duct 54 that extends from the bypass valve 36 to the fourth junction 39, and a downstream turbine duct 56 that extends from the fourth junction 39 to the water separator 40.

Figure 4:
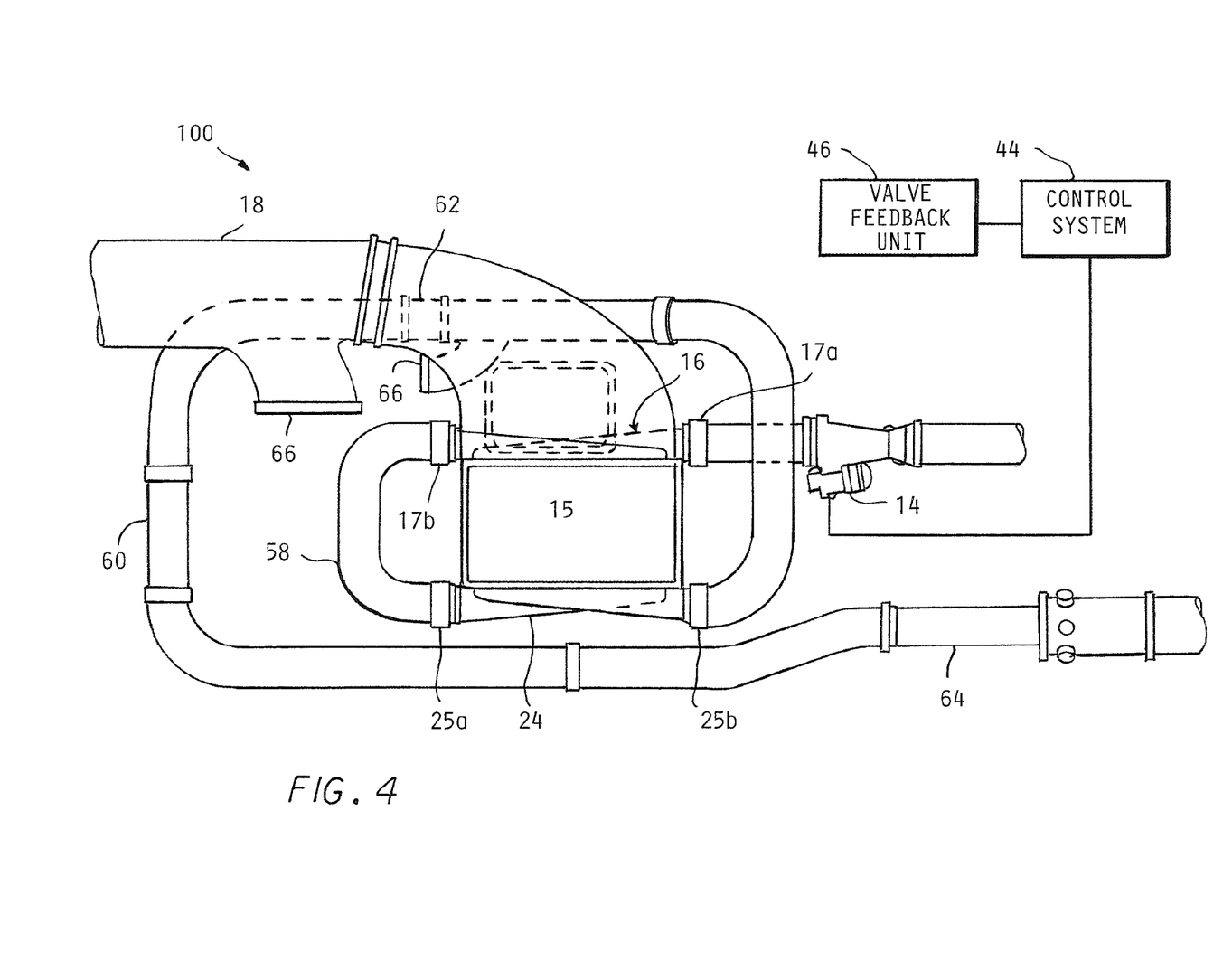
FIG. 4 is a diagram showing a flow control system of an aircraft fabricated by modifying the existing air cycle machine of the aircraft of FIG. 3 according to the method of the present invention.

In order to direct air from the outlet side of the primary stage 16 of the heat exchanger 15 to the secondary stage 24 of the heat exchanger 15, the compressor 30 and the compressor ducting section 50 are removed. A first connector duct 58 is provided to replace the compressor 30 and the compressor ducting section 50, as shown in FIG. 4, and is thus connected to both the primary stage outlet 17b of the heat exchanger 15 as well as the secondary stage inlet 25a of the heat exchanger 15. The first connector duct 58 may be substantially continuous, thereby lacking junctions or valves that would impede air flow.

Next, the turbine 38 is disconnected from the upstream bypass duct 52, the upstream turbine duct 54, and the downstream turbine duct 56, and the turbine 38 is removed. In order to replace the turbine 38, a second connector duct 60 is provided. The second connector duct 60 is connected to the upstream turbine duct 54 and the downstream turbine duct 56. Then, the bypass valve 36 and the water separator 40 are removed and replaced with a third connector duct 62 and a fourth connector duct 64, respectively, since removal of the compressor 30 and the turbine 38 has rendered them unnecessary. Remaining unused duct openings, including the upstream bypass duct 52, are sealed using caps 66. In order to replicate the electrical signals previously transmitted to the control system by the bypass valve 36, and thus avoid the need for modification to the control system 44, the valve feedback unit 46 is electrically connected to the control system 44.

Figure 5A:
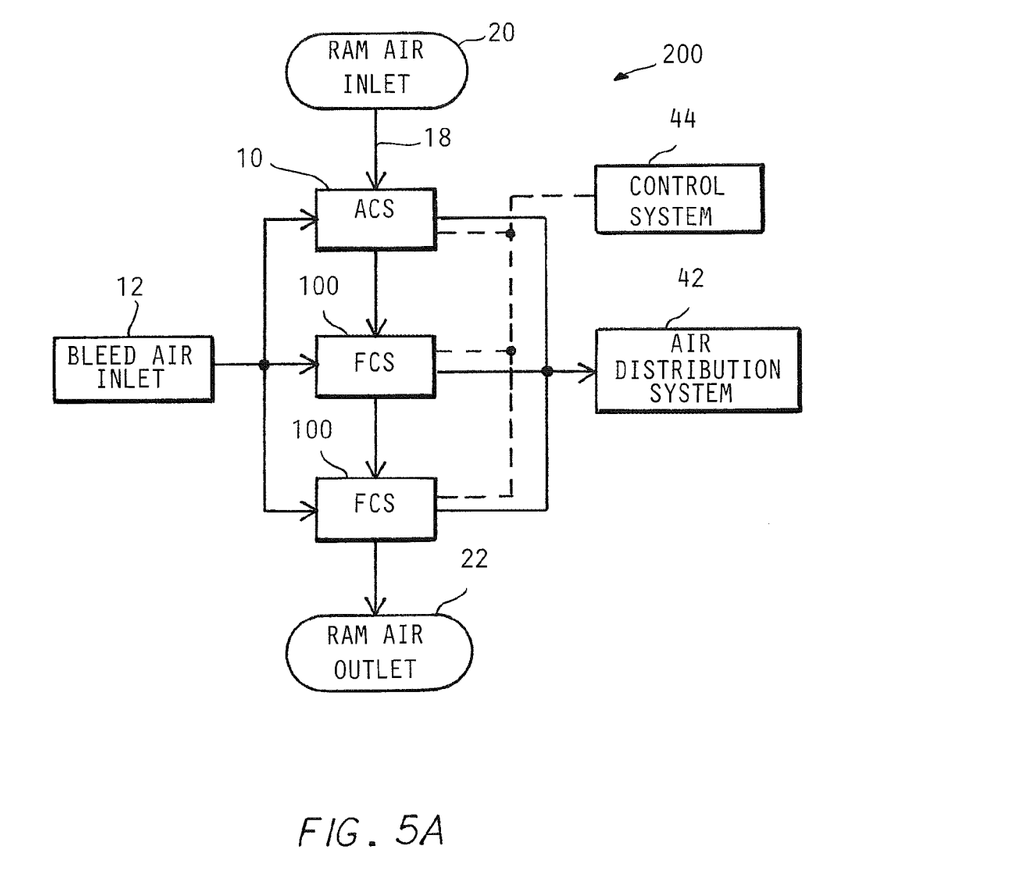
FIG. 5a is a first exemplary embodiment of an environmental control system for an aircraft according to the present invention.
Figure 5B:
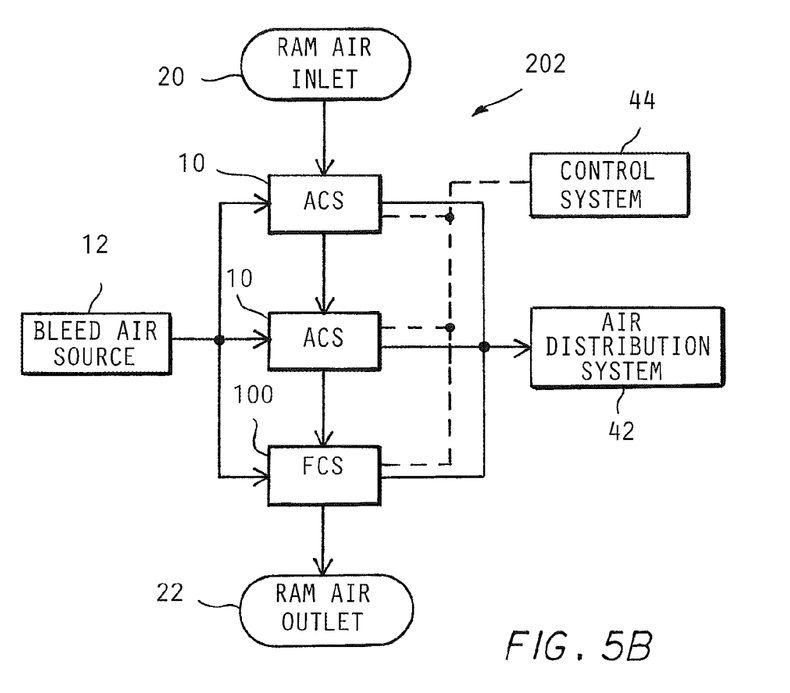
FIG. 5b is a second exemplary embodiment of an environmental control system for an aircraft according to the present invention.
Figure 5C:
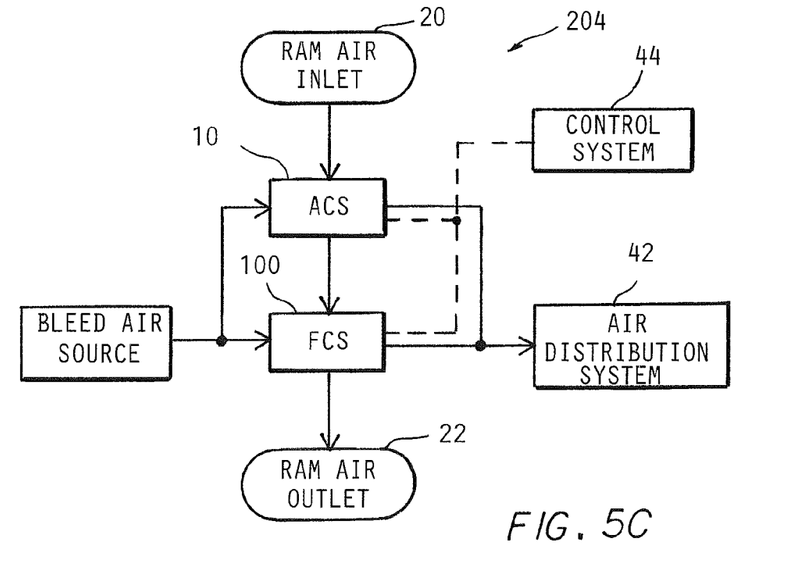
FIG. 5c is a third exemplary embodiment of an environmental control system for an aircraft according to the present invention.

The flow control system 100 may be incorporated into an aircraft in various ways, as shown in FIGS. 5a-5c. For example, in a first exemplary environmental control system 200, the bleed air inlet 12 is connected to one air cycle machine 10 and two flow control systems 100. Alternatively, a second exemplary environmental control system 202 includes a pair of air cycle machines 10 and a single flow control system 100. As a further alternative, a third exemplary environmental control system 204 includes a single air cycle machine and a single flow control system. In each case, the air cycle machines 10 and the flow control systems 100 are interconnected by manifolds (not shown) that deliver air to the air cycle machines 10 and the flow control systems 100, as well as mix the air received from the air cycle machines 10 and the flow control systems 100.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. An environmental control system for an aircraft, comprising:
   a bleed air source;
   at least a first air cycle machine that has an air cycle inlet connected to the bleed air source and is operable to provide conditioned air to an air cycle outlet;
   at least a first flow control system that has a flow control inlet connected to the bleed air source and is operable to provide cooled air to a flow control outlet, wherein the first flow control system includes a heat exchanger that includes a primary stage and a secondary stage;
   a first connector duct that connects a primary stage outlet of the primary stage of the heat exchanger of the first flow control system to a secondary stage inlet of the secondary stage of the heat exchanger of the first flow control system without junctions or valves; and
   a mixing manifold that receives conditioned air from the air cycle machine and cooled air from the flow control system and is operable to selectively provide the cooled air, the conditioned air, or mixed air to the aircraft, wherein the mixing manifold produces the mixed air by mixing the cooled air and the conditioned air.

2. The environmental control system of claim 1, wherein the cooled air produced by the first flow control system is produced solely by heat exchange.

3. The environmental control system of claim 2, further comprising:
   the first air cycle machine including at least one turbine-compressor pair to produce conditioned air.

4. The environmental control system of claim 1, further comprising:
   at least a second flow control system connected to the mixing manifold, wherein the second flow control system produces cooled air solely by heat exchange.

5. The environmental control system of claim 1, further comprising:
   at least a second air cycle machine connected to the mixing manifold, the second air cycle machine including at least one turbine-compressor pair to produce conditioned air.

6. The environmental control system of claim 1, wherein the first flow control system does not include a turbine-compressor pair.

7. An environmental control system for an aircraft, comprising:
   a bleed air source;
   at least a first air cycle machine that has an air cycle inlet connected to the bleed air source and is operable to provide conditioned air to an air cycle outlet;
   at least a first flow control system that has a flow control inlet connected to the bleed air source and is operable to provide cooled air to a flow control outlet, wherein the first flow control system includes a heat exchanger that includes a primary stage and a secondary stage;
   a first connector duct connected to a primary stage outlet of the primary stage of the heat exchanger of the first flow control system and to a secondary stage inlet of the secondary stage of the heat exchanger of the first flow control system such that air travels from the primary stage outlet of the heat exchanger of the first flow control system directly to the secondary stage inlet of the heat exchanger of the first flow control system by way of the first connector duct, wherein the first connector duct connects the primary stage outlet of the primary stage of the heat exchanger of the first flow control system to the secondary stage inlet of the secondary stage of the heat exchanger of the first flow control system without junctions or valves; and a mixing manifold that receives conditioned air from the air cycle machine and cooled air from the flow control system and is operable to selectively provide the cooled air, the conditioned air, or mixed air to the aircraft, wherein the mixing manifold produces the mixed air by mixing the cooled air and the conditioned air.

8. An environmental control system for an aircraft, comprising:

a bleed air source;

at least a first air cycle machine that has an air cycle inlet connected to the bleed air source and is operable to provide conditioned air to an air cycle outlet using at least one turbine-compressor pair;

at least a first flow control system that has a flow control inlet connected to the bleed air source and is operable to provide cooled air to a flow control outlet, wherein the first flow control system includes a heat exchanger that includes a primary stage and a secondary stage, and the cooled air produced by the first flow control system is produced solely by heat exchange at the heat exchanger;

a first connector duct that connects a primary stage outlet of the primary stage of the heat exchanger of the first flow control system to a secondary stage inlet of the secondary stage of the heat exchanger of the first flow control system without junctions or valves; and a mixing manifold that receives conditioned air from the air cycle machine and cooled air from the flow control system and is operable to selectively provide the cooled air, the conditioned air, or mixed air to the aircraft, wherein the mixing manifold produces the mixed air by mixing the cooled air and the conditioned air.

9. The environmental control system of claim 8, further comprising:

at least a second flow control system connected to the mixing manifold, wherein the second flow control system produces cooled air solely by heat exchange.

10. The environmental control system of claim 8, further comprising:

at least a second air cycle machine connected to the mixing manifold, the second air cycle machine including at least one turbine-compressor pair to produce conditioned air.

11. The environmental control system of claim 8, wherein the first flow control system does not include a turbine-compressor pair.

* * * * *